United States Patent [19]
Link et al.

[11] Patent Number: 5,517,782
[45] Date of Patent: May 21, 1996

[54] MODULAR RETAINER SYSTEM FOR LURE DRESSINGS

[76] Inventors: Donald J. Link, 1053 Legion St., Shakopee, Minn. 55379; Mark B. Uecker, 1114 Tiffany Ct., Eagan, Minn. 55123

[21] Appl. No.: 160,892

[22] Filed: Dec. 1, 1993

[51] Int. Cl.⁶ .................................................. A01K 85/00
[52] U.S. Cl. .................... 43/42.31; 43/42.37; 43/42.06; 43/44.8; 43/42.38
[58] Field of Search ................... 43/42.31, 42.37, 43/42.38, 44.8, 42.06, 42.28; 24/16 PB

[56] References Cited

U.S. PATENT DOCUMENTS

| | | | |
|---|---|---|---|
| 2,736,123 | 2/1956 | Peterson | 43/42.38 |
| 2,910,800 | 11/1959 | Cicala | 43/42.37 |
| 3,066,434 | 12/1962 | Duller | 43/42.38 |
| 4,625,451 | 12/1986 | Griffiths | 43/44.8 |
| 5,001,856 | 3/1991 | Gentry | 43/42.37 |
| 5,018,297 | 5/1991 | Kennedy, Jr. | 43/42.06 |
| 5,038,513 | 8/1991 | Hardin | 43/42.31 |
| 5,230,178 | 7/1993 | Dillard | 43/44.8 |

Primary Examiner—Kurt Rowan
Attorney, Agent, or Firm—D. L. Tschida

[57] ABSTRACT

An elastomer fishing lure dressing retainer and mating sound chamber. A body piece secures the retainer to a lure and/or to a lure dressing. One or more integral, accessory retainers radiate from the body to secure a rattle or other dressings to the lure. Alternative retainers provide open looped bands or tubular body and accessory pieces to contain a discreet rattle, scent, beads and/or a plug which enhances sound and/or stores scent. Alternative discreet rattle constructions, which mate to the retainers, provide a bead containing housing having a flanged mounting head. A plug may be recessed or project from the housing or a tubular accessory piece and may comprise a bead, or open cavity plug for amplifying sound or storing scent.

23 Claims, 8 Drawing Sheets

MODULAR RETAINER SYSTEM FOR LURE DRESSINGS

BACKGROUND OF THE INVENTION

The present invention relates to fishing lure dressings and, in particular, to an elastomer retainer for containing varieties of dressings to a lure, including multi-filament skirts and rattles. The retainer may form a portion of the dressing, such as a rattle housing.

A growing appreciation of the significance of vibration and sound as an attractant to fish has led to the development of numerous so-called "rattle" lures. Such lures are constructed with relative ease from plastic. Cavities or "sound chambers" are constructed into the lure body and contain a number of beads. With normal lure retrieval and body action, the contained beads strike the lure body to create audible sounds and/or vibrations which are perceptible by a preferred predator fish species.

A variety of other lure types constructed of elastomer materials have also been adapted to accommodate discreet rattles. Elastomer lures are typically molded to imitate natural bait species, for example, worms, crayfish, frogs, and salamanders. The discreet rattles developed for these lures provide a shaped housing which contains one or more beads. The housings are constructed of plastic, blown glass, and extruded or formed metals. The housing shape is formed to permit insertion of the rattle into a lure body at prepared cavity spaces. Alternatively, the rattle may be inserted substantially anywhere within the soft bodied material, upon piercing the body with the rattle.

Other lure constructions which constitute a significant portion of the market are wire form spinner lures and molded jig lures. These lures typically provide a molded lead body which may be formed to a stainless steel wire. A multi-filament elastomer skirt is typically mounted to the body with a single bore, elastomer band commonly referred to as a "skirt collar," such that the filaments radiate about the lure body.

Although the foregoing lures have proven effective for catching fish, wire form and molded bodied jigs do not readily accommodate the inclusion of a sound source, such as a rattle. The subject invention therefore seeks to efficiently adapt such lures to sound. A modular assembly has particularly been developed for containing discreet and integral sound chambers to the molded bodies of these lures.

SUMMARY OF THE INVENTION

It is accordingly a primary object of the present invention to provide a modular system which permits the retention of a sound or vibration producing dressing assembly to a fishing lure.

It is a further object of the invention to provide an elastomer retainer which mounts to a lure body to separately retain a multi-filament skirt and one or more rattle or scent retainers to the lure.

It is a further object of the invention to provide a molded retainer construction having a lure retainer piece and integral accessory support pieces.

It is a further object of the invention to provide an extrudable retainer construction, which can be cut to size, and which provides multiple-open loops.

It is a further object of the invention to provide a rattle chamber having a tubular housing which terminates at a shaped end piece that mounts to the elastomer retainer, which captures one or more beads within a bore, and which can be plugged with a shaped plug or a bead conformally secured to the housing.

It is a further object of the invention to provide a tubular, elastomer retainer having a retainer piece which can be threaded over a hook and from which depends one or more open loop bands or tubular accessory cavities, and which bands or accessory cavities can support discreet rattles or prepared scents.

It is a further object of the invention to provide an open cavity plug which can either be recessed or project from the rattle housing or accessory cavity and the cavity of which plug can be shaped to provide sound amplification.

Various of the foregoing objects, advantages and distinctions of the invention are achieved in a number of presently preferred constructions. In one presently preferred construction, an elastomer material is formed to provide an open looped a retainer having a lure retention piece and one or more integral accessory support pieces. The lure retention piece secures the retainer and/or a filamentary skirt directly to a hook or lure body. The accessory pieces retain discreet rattle housings to the lure. A preferred rattle housing has a flanged fore-end which mates to an accessory piece. A recessed or projecting plug retains one or more beads in the housing. The plug may comprise a bead conformally mounted to the housing or a shaped open cavity plug.

In another, molded elastomer construction, a tubular retainer body provides a cavity which can be threaded over a fish hook and onto a lure body. One or more integral, accessory retainers radiate from the body. The accessory retainers can comprise open bored bands or bored tubular pieces. The accessory tubes can contain prepared scents, commercially available sound chambers or may be adapted to form the housing of an integral rattle.

In the latter construction, the accessory tube includes one or more beads and a plug which conformally mounts to the accessory tube. The plug can be shaped to include a flanged housing fastener and provide a large diameter bellows which amplifies sounds created by the trapped beads upon striking the plug.

Still other objects, advantages and distinctions of the invention, as well as other considered constructions are described in greater detail below with respect to the appended drawings. To the extent various modifications and improvements have been considered, they are described as appropriate. The description should not be literally construed in limitation of the invention, which rather should be interpreted within the scope of the appended claims.

DESCRIPTION OF THE PREFERRED EMBODIMENT

Figure 1:
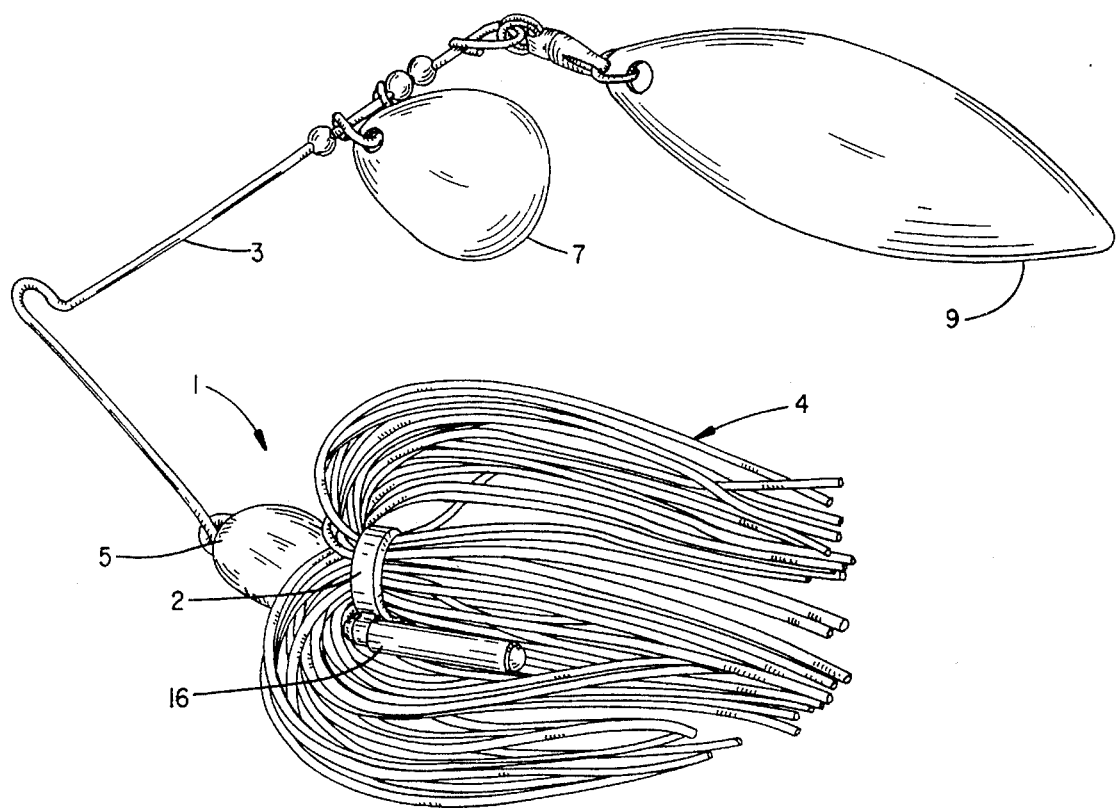
FIG. 1 is a perspective drawing of a skirted wire form lure wherein the skirt dressing is bound to the lure body with a retainer of the invention.

Referring to FIG. 1, a perspective drawing is shown of a wire formed lure 1 which includes an improved multi-apertured collar or retainer 2 of the invention. A formed wire 3 projects from a molded body 5 and a pair of spinner blades 7, 9 are secured to the wire 3. The retainer 2 secures a multi-filament skirt 4 to the body 5, along with a sound or "rattle" chamber 16 which is described in greater detail below.

Figure 2:
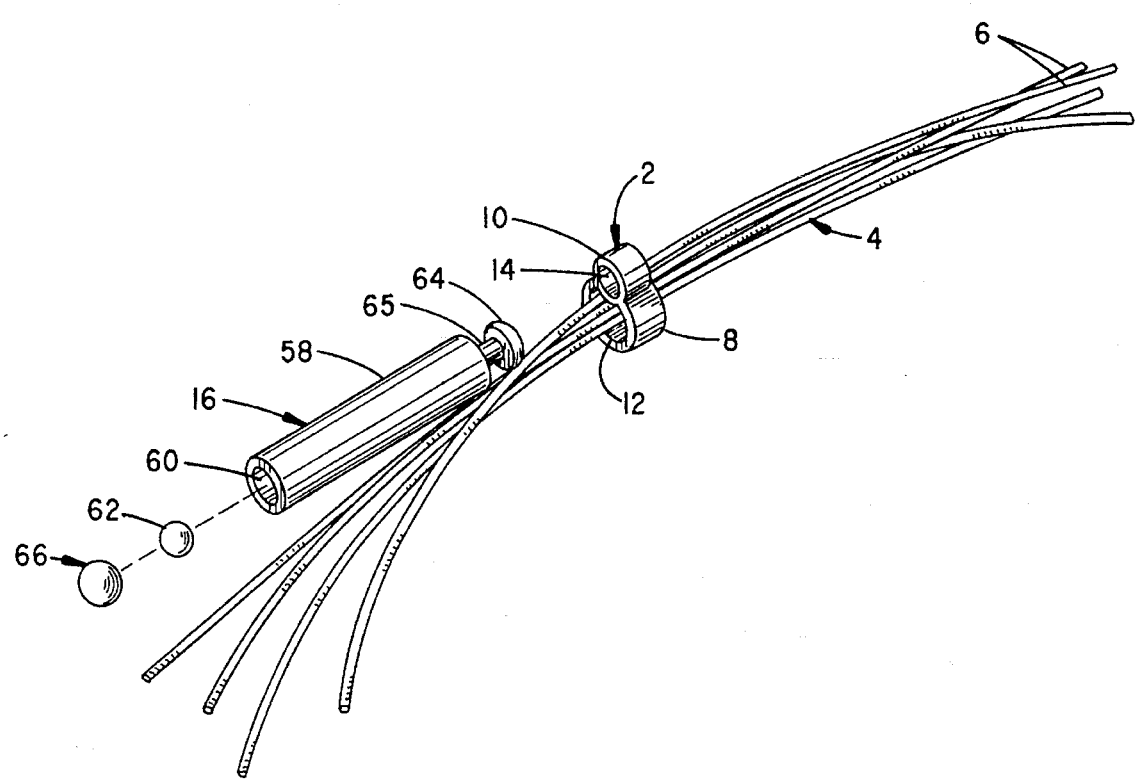
FIG. 2 is a perspective drawing of a bound skirt dressing and showing an exploded assembly of an improved rattle chamber of the invention.

FIG. 2, in turn, depicts an exploded assembly view of the novel retainer 2, removed from the lure 1. The retainer 2 is constructed from an elastomer material, such as polycarbonate, rubber or polyvinyl. A variety of elastomeric materials may be used, provided the material is capable of withstanding freshwater and saltwater environments and exposure to sunlight, heat and other external abuses to which fishing lures are normally subjected.

The retainer 2 mounts about the skirt 4 to securely retain a number of strands 6 in a cluster to the lure 1. The strands 6 are typically dyed or colored with various colorants and glitter materials to present a preferred lure presentation, such as for the spinner or "blade" lure 1 or the "jig" lure 34 of FIG. 4.

The retainer 2 is injection molded or may be extruded to provide a body piece 8 and from which an accessory piece 10 integrally, radially projects. The body 8 includes an aperture 12 which receives the skirt 4 and the accessory piece 10 includes an aperture 14 which receives a novel rattle chamber 16. The rattle chamber 16 is shown in exploded assembly and described in greater detail below.

Typically, it is anticipated the length of the body and accessory pieces 8, 10 will differ and the retainer 2 is therefore injection molded. Alternatively, a retainer 2 of equal length body and accessory pieces can be cut from an extruded tube stock having a desired number of bores of desired wall thickness.

The aperture 12 is sized to accommodate a typically intended mounting, such as to encompass the skirt 4 and a fish hook or appendage of a lure body. A typical inside diameter of the aperture 12 might be sized in a range of 0.060 to 0.10 inches. Similarly, the accessory aperture 14 is sized to accommodate an attached lure dressing and for the discussed lures typically provides a diameter of 0.050 to 0.075 inches.

Depending upon the foregoing dimensions and the material, the wall thickness of the retainer 2 is properly sized to achieve a durable retainer 2. Presently considered wall thicknesses are sized in a range of 0.050 to 0.075 inches.

Figure 8:
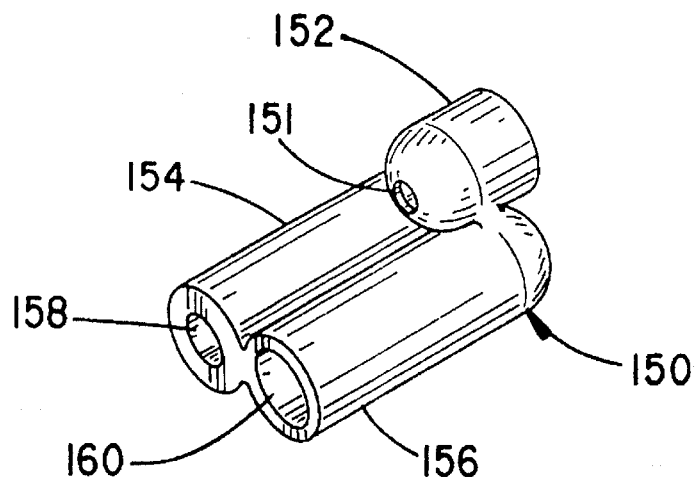
FIG. 8 is a perspective drawing of a tubular retainer having a pair of integral rattle/scent accessory pieces.

Although a uniform wall thickness is shown, it is to be appreciated the thickness can be varied at either of the body or accessory pieces 8, 10, for example, see the alternative retainer 150 of FIG. 8. Upon properly selecting the material and adjusting the sizing of the body and accessory pieces 8, 10, the skirt 4 and rattle chamber 16 are compressively secured to the retainer 2 and the retainer 2 to the lure 1.

Figure 3:
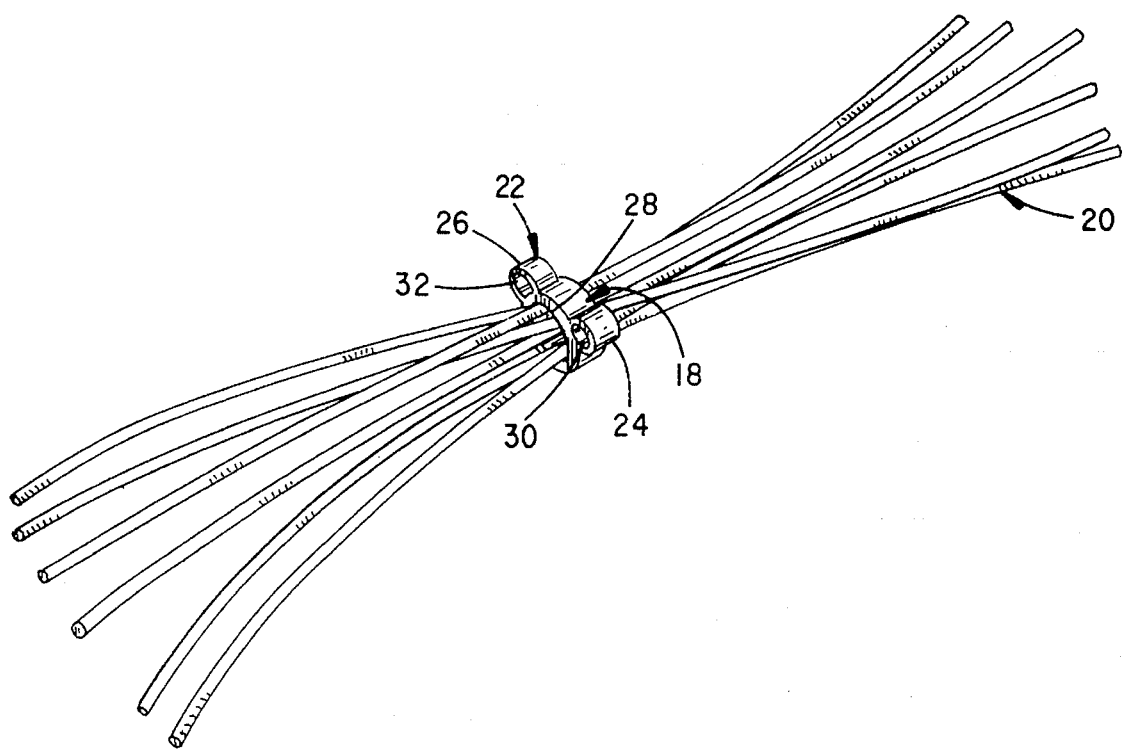
FIG. 3 is a perspective drawing of a skirt dressing bound with a retainer having a pair of accessory retainer pieces.

FIG. 3 depicts an alternative retainer 18, which also is mounted about a skirt 20. A body piece 22 includes a pair of accessory pieces 24, 26 which integrally radiate from the body 22 such that provided apertures 28, 30 and 32 project at approximately 90 degrees from one another. It is to be appreciated the accessory pieces 24, 26 can be positioned at a variety of angular orientations to the body 22. Additional accessory pieces may also be included.

Figure 4:
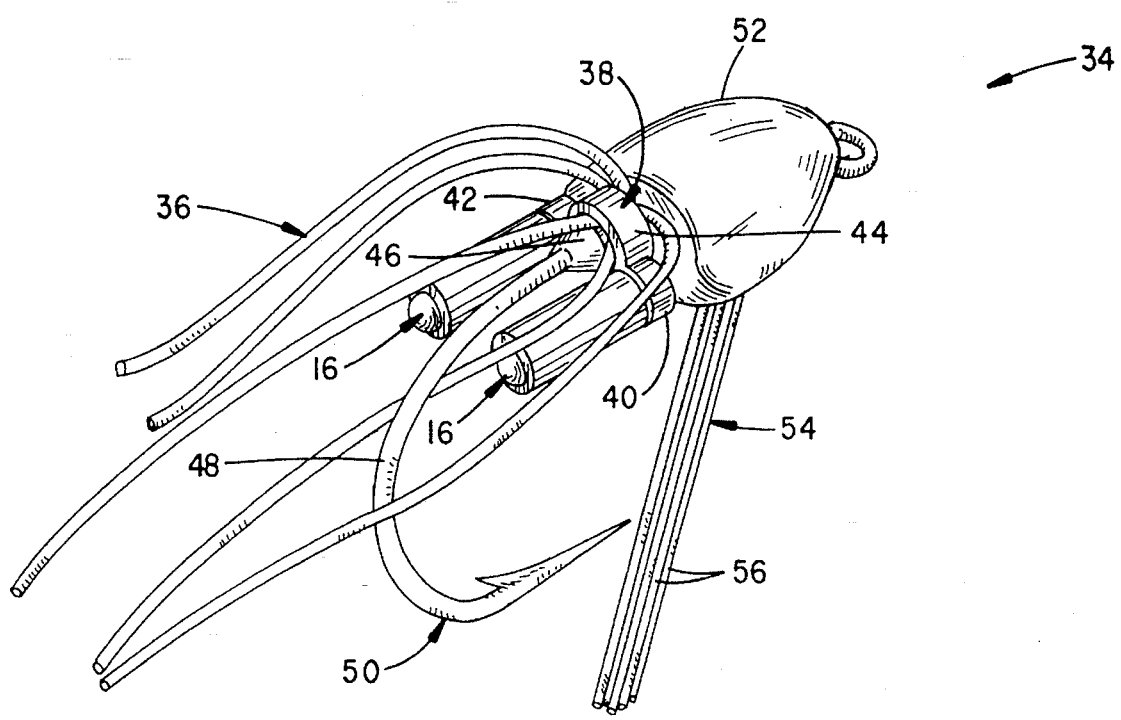
FIG. 4 is a perspective drawing of a skirted "jig" lure which supports a pair of rattle chambers at the retainer.

FIG. 4 discloses a lure 34 of the latter configuration and to which a skirt 36 is secured by a retainer 38. The retainer 38 particularly provides a pair of accessory pieces 40, 42 which project from a body 44 in a planar alignment, i.e. approximately 180 degrees to one another. Secured to each of the accessory pieces 40, 42 are separate rattle chambers 16.

The skirt 36 is retained to an appendage 46 which projects along a shank 48 of a fish hook 50. The hook 50 is integrally molded into a weighted head 52 and from which a weed guard 54 projects. The weed guard 54 is formed of a number of nylon bristles 56.

Although two types of lures 1 and 34 are shown, it is to be appreciated still other lures can be adapted to use the band retainers 2, 18 and 38. Varieties of other lure accessories or dressings, other than skirts 4 and rattle chambers 16, may be mounted to the accessory pieces 10, 24, 26, 40 or 42.

Returning attention to FIG. 2 and the exploded assembly depiction of the improved rattle chamber 16, the chamber 16 is configured of a tubular, molded plastic housing 58. Mounted within a bore 60 are one or more beads 62. A forward end of the housing 58 is molded to provide a flanged head 64. Recess 66 of the head 64 mounts within the accessory aperture 14 and whereby the chamber 16 is secured to the retainer 2. It is to be appreciated a number of commercially available rattles, such as rattle 102 of FIG. 7, can also be mounted to the aperture 14.

The housing 58 is formed of a hardened plastic material, but which material permits a slight expansion upon exposure to heat. This property permits a permanent retention of a plug piece 65 to the housing 58. As depicted, the plug piece 66 can comprise a head of slightly larger diameter than the beads 62 mounted within the housing. Other solid and open bodied plugs can be adapted to the housing 58.

Figure 9:
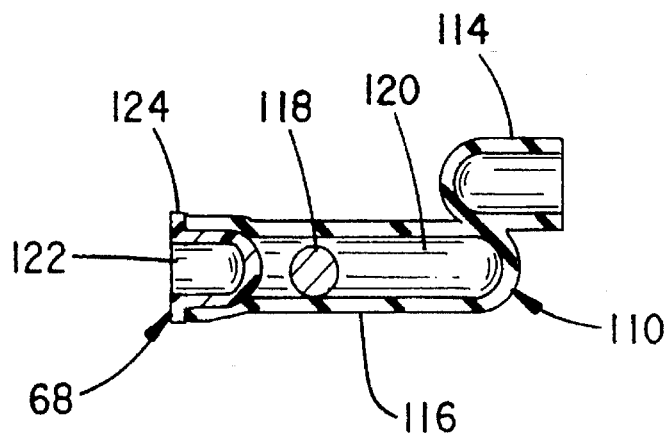
FIG. 9 is a cross section view through a tubular retainer having a recessed, open cavity plug piece.
Figure 10:
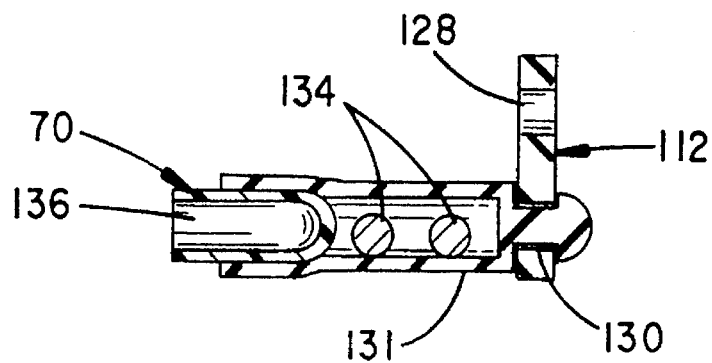
FIG. 10 is a cross section drawing of an improved discreet rattle having a projecting plug piece secured to a retainer band.
Figure 11:
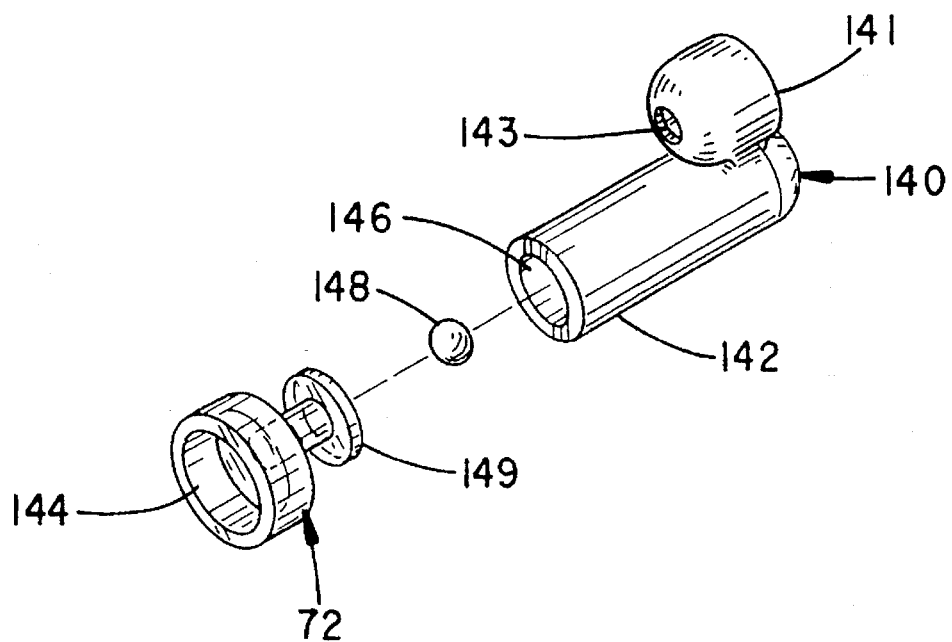
FIG. 11 is a perspective drawing shown in exploded assembly of a retainer having an integral elastomer sound chamber capped by a flanged plug constructed to amplify sound.

Examples of alternative plugs 68, 70 and 72 are shown at FIGS. 9, 10 and 11 below with respect to alternative retainer constructions. In lieu of a solid bodied plug, the plugs 68, 70 and 72 provide open cavity spaces for variously containing scent material or promoting sound transmission. The details of such plugs are discussed below.

Figure 5:
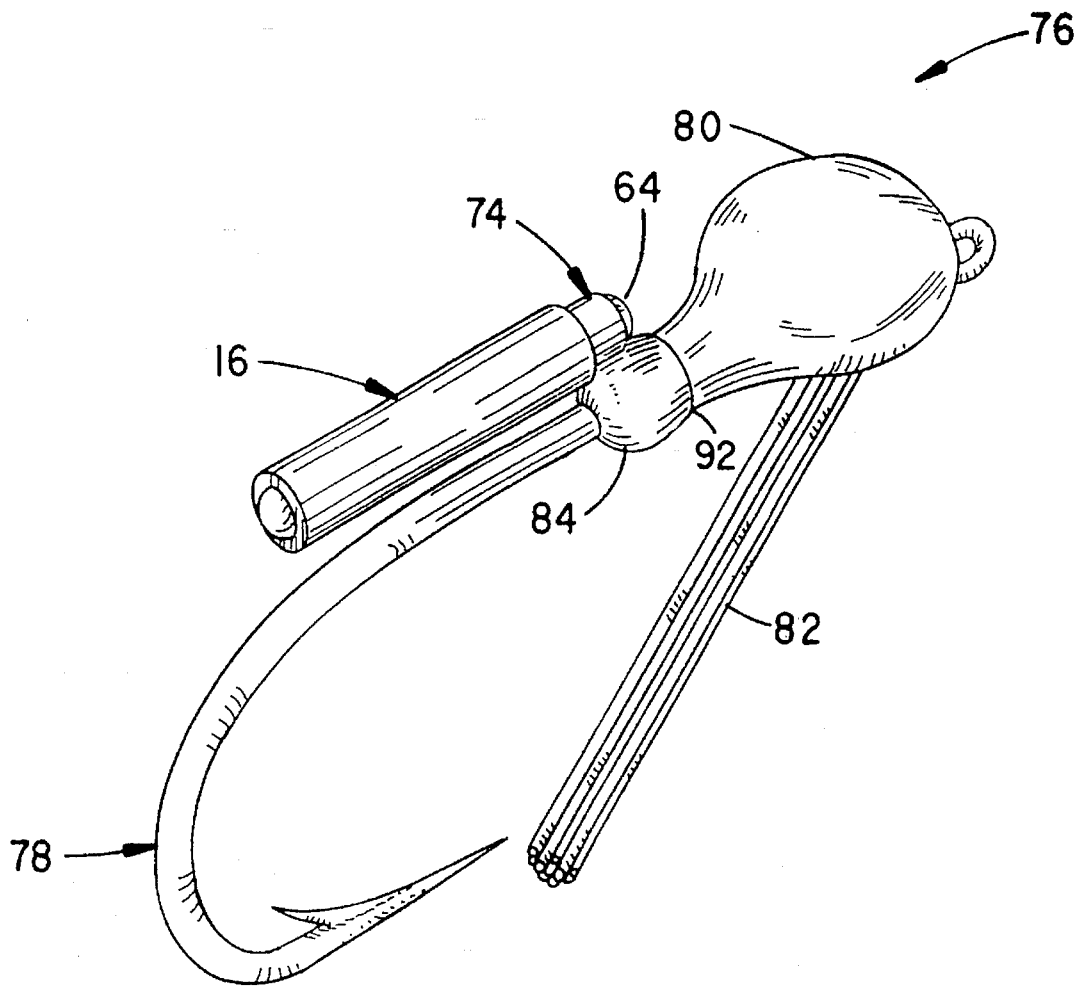
FIG. 5 is a perspective drawing of a jig body and a retainer body having a tubular body piece and a looped accessory piece.
Figure 6:
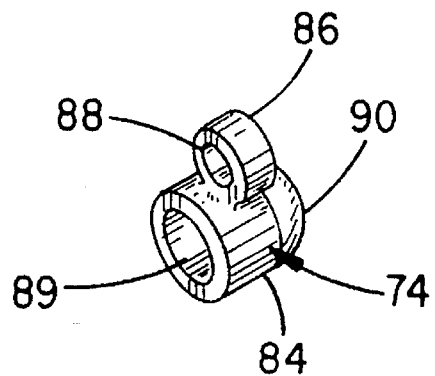
FIG. 6 is a perspective drawing of the retainer of FIG. 5.

Referring to FIG. 5, an alternative retainer 74 is shown which is mounted to a jig type lure 76. The lure 76 includes a hook 78 and weighted head 80 and from which head 80 a weed guard 82 projects. A rattle chamber 16 is secured to the retainer 74 and projects in an aligned parallel orientation to the shank of the hook 78. The retainer 74, which is also shown in detail at FIG. 6, provides a tubular, closed-ended body piece 84. Integrally molded to the body 84 and projecting to one side is a looped accessory piece 86 having a bore 88. The head piece 64 of the rattle mates with the bore 88.

Although the body 84 of the retainer 74 does not lend itself to direct attachment of a skirt to the lure, various other dressings may be applied to the hook 78, such as plastic worms, or alternatively live bait. Additional accessory pieces 86 might also be included at the body to retain a skirt.

An end 90 of the body 84 is closed to provide a form of diaphragm and through which the hook 78 is threaded, upon attaching the retainer 74 to the lure 76. That is, upon piercing the end 90, the retainer 74 is partially retained to the lure 76. Upon further directing a bore 89 of the body 84 over a lure projection 92, the body 84 compressively secures the retainer 74 to the lure head 80. Multiple active attachment mechanisms are thus provided by the body 84 to assure a durable mounting of the retainer 74 to the lure 76. Alternatively, the end 90 may include an aperture to facilitate retainer mounting.

Figure 7:
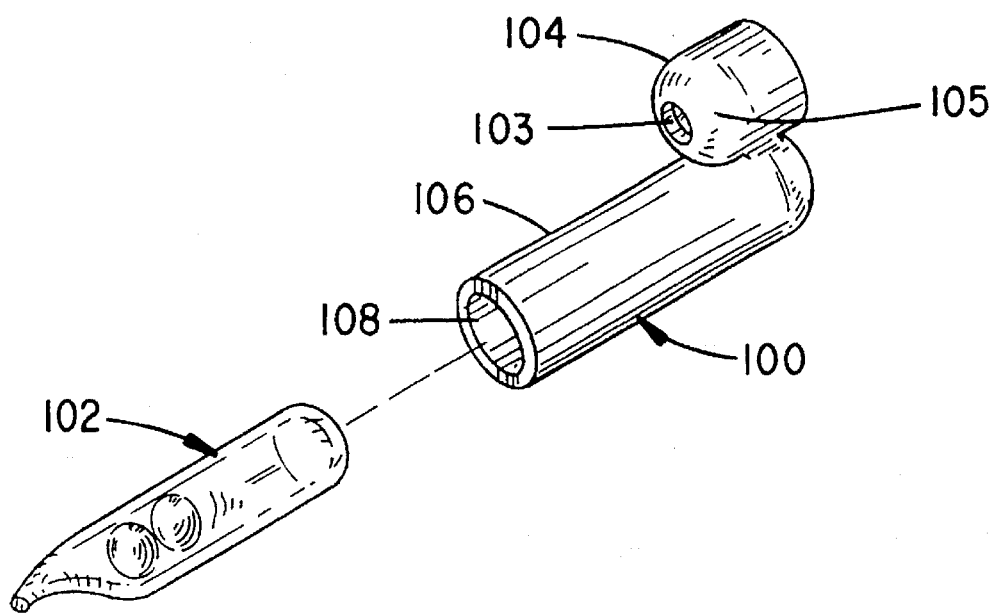
FIG. 7 is a perspective drawing shown in exploded assembly of a tubular retainer having an accessory piece which supports a discreet rattle.

FIG. 7 depicts an alternative retainer 100 and in relation to which a discreet sound chamber 102 is depicted in exploded assembly. The retainer 100 provides a body 104, having an end 105 which contains a bore 103. Integrally molded to the body 104 is a tubular accessory piece 106. A cavity 108 of the accessory piece 106 retains the sound chamber 102. The bore 103 is provided to receive the shank of a hook or possibly a wire-form member used in the construction of the lure.

The length of the cavity 108 can be varied depending upon the particularly intended accessory to be mounted thereto. In lieu of mounting a specific accessory to the cavity 108, it is to be appreciated a variety of pre-packaged scent materials can be inserted into the cavity 108 and which material dissolves over time to provide an appealing scent with lure use.

FIG. 8 depicts another retainer 150 which has a bore 151 containing body 152 and from which body integrally project a pair of tubular accessory pieces 154 and 156. The wall thickness of the piece 154 is slightly thickened from that of the piece 156 such that the provided bores 158, 160 present differing aperture sizes. One accessory piece might be used to contain a rattle chamber (e.g. 102) and the other might contain a scent material.

In the latter regard, attention is directed to FIG. 9 and which depicts a cross section view of an elastomer retainer 110. The retainer 110 includes a closed ended body 114 and from which radiates a tubular accessory piece 116. A bead 118 is retained within a cavity space 120 via a plug 68, which is recessed into the cavity 120.

Although the retainer 110 and accessory piece 116 are constructed of an elastomer, sound is obtained upon the bead 118 striking the open ended plug 68. That is, the plug 68 is constructed of a material substantially harder than the retainer 110 such that vibration and audible sound is obtained. The inclusion of a cavity 122 in the plug 68 accentuates the obtained sound. Alternatively, the cavity 122 can be used to receive scent material. The plug 68 is further formed to include an annular flanged shoulder 124 to facilitate retention of the plug to the accessory piece 116. Other flanges or appendages can be provided along the plug 68 to facilitate retention to the accessory piece 116.

FIG. 10 depicts a retainer 112 similar to the retainer 2. A pair of apertures 128 and 130 respectively permit mounting the retainer 112 to a lure and to a rattle housing 131. A pair of beads 134 are retained within the housing 131 adjacent the plug 70. The housing 131 and plug 70 are constructed of similar plastic materials. In contrast to the plug 68, the plug 70 projects outwardly from the housing 131 to facilitate sound amplification. The beads are thus able to produce a sound, whether or not a scent material is contained at the cavity 136. Because the housing 131 and plug are constructed of hardened materials to augment sound transmission, the cavity 136 can be used to contain a scent material, without adversely affecting the lure's presentation.

In appreciation of perceived improvements in the audible sound transmission, FIG. 11 depicts an elastomer retainer 140 which is constructed in a fashion similar to the retainer 100 of FIG. 7. A body piece 141 having a bore 143 supports an accessory piece 142. In contrast to the plugs 68 and 70, the plug 72 substantially projects from the accessory piece 142. An enlarged end cavity 144 extends from the plug 72 and exhibits an inside diameter substantially larger than the bore of an accessory cavity 146. A typical maximum diameter might be selected in a range of 0.20 to 0.40 inches.

The cavity 144 can exhibit a variety of shapes, for example, conical, cylindrical or variations thereof. The shape is principally selected to provide a megaphone cavity to enhance sound transmission upon a bead 148 striking a flanged retention piece 149, which projects from the plug 72 and is retained within the cavity 146. It is to be appreciated the plug 72 can be mounted to the housing 58 or other rattle housings to enhance produced sounds.

While the invention has been described with respect to various presently considered embodiments and improvements and modifications, it is to be appreciated still other constructions may be suggested to those skilled in the art. The description should therefore not be strictly construed to the presented constructions, but rather should be interpreted to include all those equivalent embodiments within the spirit and scope of the following claims.

What is claimed is:

1. A fishing lure comprising:

a) a hook;

b) a lure body mounted to said hook and including a projecting appendage; and c) a molded elastomer body having a first bore and an integral accessory piece having a second bore, wherein said first bore mounts over said appendage, wherein a longitudinal axis of each of said first and second bores extend in displaced parallel relation to one another, and wherein said second bore includes means for producing audible sounds.

2. Apparatus as set forth in claim 1 wherein the sound producing means includes a bead and means responsive to movement of said bead to produce sound.

3. Apparatus as set forth in claim 1 wherein the sound producing means includes a bead and a plug means for retaining said bead within the second bore.

4. Apparatus as set forth in claim 3 wherein said plug means includes an open-ended cavity.

5. Apparatus as set forth in claim 1 wherein the sound producing means comprises a housing containing a captive bead.

6. Apparatus as set forth in claim 1 wherein the sound producing means comprises a bead and plug means secured to said second bore for retaining said bead within said second bore.

7. Apparatus as set forth in claim 1 wherein said sound producing means comprises a tubular housing including a bore, a head projecting from an end of said housing and displaced by an annular recess adjacent said head and a bead and plug means mounted to said housing for retaining said bead within the bore.

8. Apparatus as set forth in claim 7 wherein said plug means includes an open-ended cavity displaced aft of said housing.

9. Apparatus as set forth in claim 7 wherein the plug means comprises a bead which is restrained within the bore of the housing.

10. Apparatus as set forth in claim 1 wherein said first bore includes an opening to said first bore at a fore end and an end wall at an aft end, and wherein said second bore includes a closed end wall at a fore-end and an opening at an aft end.

11. A fishing lure dressing comprising:
   a) an elastomer body having a first bore and an accessory piece having a second bore, wherein said first bore is shaped to compressively mount over an external appendage of a fish lure, and wherein said accessory piece integrally projects from said body; and
   b) audible means for producing sound, comprising i) a housing having a bore, ii) a bead, and iii) retainer means for retaining said bead within the bore of said housing, and wherein said audible means is mounted within said second bore.

12. Apparatus as set forth in claim 11 wherein said housing includes a head having an annular flange and wherein said flange mounts to said second bore.

13. Apparatus as set forth in claim 11 wherein the retainer means comprises a second bead which is restrained to the bore of the housing.

14. Apparatus as set forth in claim 11 wherein the retainer means comprises a plug having an open-ended cavity and means for retaining the plug to said housing.

15. Apparatus as set forth in claim 14 wherein said retainer means includes a flanged appendage which mounts to said housing such that said open-ended cavity projects from said housing and amplifies sound created from the bead striking the retainer means.

16. Apparatus as set forth in claim 11 including a lure dressing having a plurality of filaments secured within said first bore.

17. Apparatus as set forth in claim 11 wherein said body piece and accessory piece comprise first and second annular bands and wherein a longitudinal axis of the first and second bores extend parallel to one another.

18. Apparatus as set forth in claim 11 wherein said first bore extends in a first tubular member having an exposed bore opening.

19. Apparatus as set forth in claim 18 wherein an aperture is formed in an endwall of the first tubular member opposite the bore opening.

20. Apparatus as set forth in claim 18 wherein said accessory piece comprises a second tubular member projecting in parallel alignment to the first tubular member.

21. Apparatus as set forth in claim 17 wherein said first and second annular bands radially extend from a third annular band and wherein a diameter of said third annular band is greater than a diameter of said first and second annular bands.

22. Apparatus as set forth in claim 21 wherein said first annular band also supports audible means for producing sound.

23. A fishing lure dressing comprising:
   a) an elastomer retainer including a tubular member, wherein the tubular member includes a first cavity having a first exposed bore, and an integral second member having a second exposed bore, wherein a longitudinal axis of each of said first and second members extend parallel to one another, and wherein said first cavity is secured to an appendage of a fishing lure; and
   b) sound means for creating audible sounds comprising a tubular housing containing at least one bead and plug means for retaining said bead within the housing, wherein said plug means includes an open-ended cavity displaced from the housing, and wherein an inside diameter of the plug cavity is greater than an inside diameter of the housing.

* * * * *